Nov. 10, 1942.  W. BROWN  2,301,852
EPICYCLIC VARIABLE SPEED GEARING
Filed Sept. 29, 1941
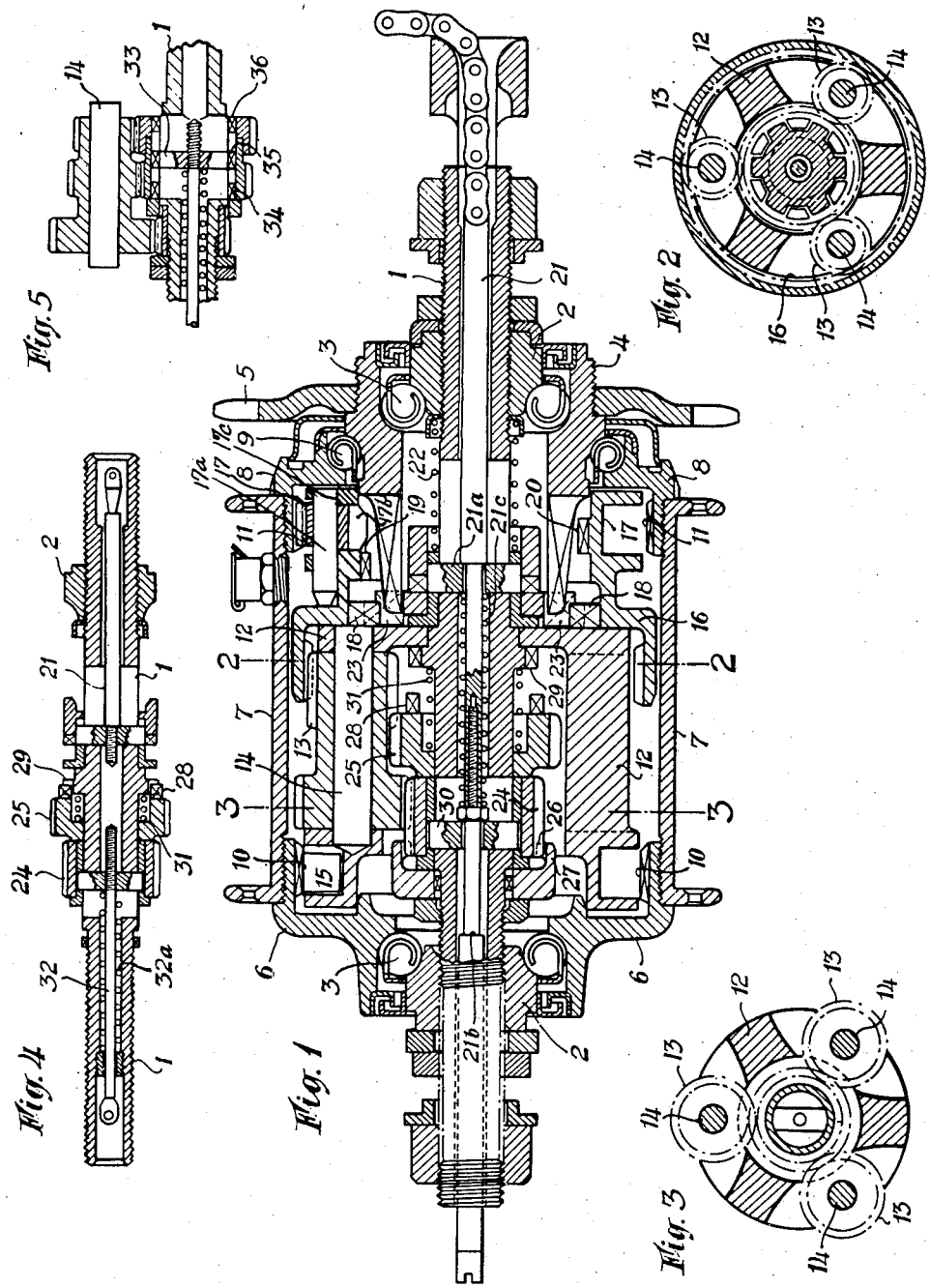

Patented Nov. 10, 1942

2,301,852

UNITED STATES PATENT OFFICE 2,301,852

EPICYCLIC VARIABLE SPEED GEARING

William Brown, Nottingham, England, assignor to Sturmey-Archer Gears Limited, Nottingham, England Application September 29, 1941, Serial No. 412,773
In Great Britain April 20, 1940

9 Claims. (Cl. 74—275)

This invention relates to epi-cyclic variable speed gearing, by which term is meant an arrangement of gearing for providing a variable ratio not only between in-put and out-put speeds, but between in-put and out-put torques also.

The primary adaptation of the invention, as at present contemplated, is to variable speed gear hubs for cycles, in which arrangements the gearing is enclosed or housed within a member which constitutes a part of the ultimate drive. However, the invention is applicable also to gears for other purposes, including those in which the gearing is enclosed in a fixed casing, and whether the central axle is stationary, as in a cycle hub, or not.

The invention comprises improvements in variable speed gears of a type or class defined by having an epicyclic train in combination with alternative ratchet and pawl drives to the final out-put member, and by having means for coupling the in-put member to the annulus of the train so as to drive the out-put member either directly through one of the ratchets, or indirectly through the planet cage and the other ratchet. An example of gear having this characteristic may be found in the specification of U. S. Patent No. 2,168,600 August 8, 1939.

With such arrangement, as hitherto known, the maximum number of speeds obtainable with a single epi-cyclic train, i. e. with a single annulus, has been three, and it is one object of this invention to provide for one, two, or more additional speeds and without necessitating any substantial modification in the design of the parts hitherto employed.

According to this invention, there are provided two or more co-axial sun wheels for the said epicyclic train, with supplementary planet pinions engaging a common annulus, and means is provided for selectively bringing one or other of these sun wheels into the drive, at will. The common annulus may be of uniform diameter and engage with one part only of compound planet pinions, or engage with independent pinions of different diameter mounted on different axles; or the common annulus may be of two or more diameters, each part having its own set of planet pinions, the arrangement used being dependent on the gear ratios required.

With gears of the class or type above defined, having the alternative ratchet and pawl drives, one of which is overrun when the other is operative and the other of which is tripped out when the one is operative, three speeds may be obtained by moving a control member progressively through three positions, representing seriatim "decrease", "direct-drive" and "increase." In some forms of the present invention, the selection of the alternative sun wheels to provide a fourth speed (also a decrease), is obtained by a further movement of the control member in the same direction, but so that its fourth selection becomes cumulative with the third selection and not in place of it. A limitation of this form of the invention is that it is not possible to have both increase and decrease with the additional sun wheel in use.

In other forms, however, and according to a further feature of the invention, additional control means is provided, whereby the alternative sun wheels may be selected independently of the movement of the first selector, i. e. regardless as to whether the epi-cyclic system is arranged for increase, direct-drive, or decrease. Such dual control makes it possible to obtain the increase and the decrease with any one of the sun wheels, so that the total number of speeds available from the gear will always be one more (representing the direct drive) than twice the number of sun wheels.

The drawing filed herewith shows examples of the improved gear, as adapted for use in a hub-gear of a pedal cycle:

Fig. 1 is a vertical section through a four-speed hub-gear on its median plane;

Figs. 2 and 3 are transverse sections on the lines 2—2 and 3—3 of Fig. 1 respectively, to a smaller scale;

Fig. 4 is a vertical section to illustrate a modification which adapts the gear as a five-speed gear; and Fig. 5 is a like view to Fig. 4 illustrating an adaptation of the gear as a seven-speed gear.

Referring to Figs. 1 to 3 of the drawing, there is a fixed central axle 1, on the ends of which are cones 2 which, by means of the bearing-balls 3, support respectively the driving dog 4, carrying the driving sprocket 5, and the supporting member 6 carrying one end of the hub shell 7, the other end of which is mounted on the supporting member 8, which, in turn is journaled by the bearing-balls 9 on the said driving dog 4. The supporting members 6 and 8 are formed with ratchet teeth 10 and 11 respectively on their inner face. Surrounding the central axle 1 is the planet cage 12, which carries three compound planet pinions 13 on studs 14, and the outer end of that cage carries ratchet pawls at 15 to cooperate with the teeth 10 on the supporting member 6. The pawl or pawls 15 for the ratchet 10 lie in the groove of member 12, as clearly shown at the upper left hand corner of Fig. 1, and are in continual engagement with the ratchet teeth 10 of the supporting member 6 and do not need to be tripped at any time. Meshing with the smaller parts of the compound pinions 13, is the internally-toothed annulus 16, which carries pawls at 17 co-operating with the teeth 11 on the supporting member 8. The pawls 17 for the ratchet 11 lie in the groove in the annulus 16. These pawls 17 are pivotally mounted as at 17a and, in addition to engaging the ratchet teeth 11, have extensions 17b passing through slots 17c in the floor or web of the said groove. These extensions of said pawls are dislodged by the sliding member 23 when in the extreme right hand position so as to move the pawls about their fulcra and withdraw their tips from the ratchet teeth 11.

The inner part of the planet cage 12, is formed with lateral dogs 18, and the annulus 16 is formed with two sets of internal dogs or splines 19 and 20, in different transverse planes. Slidable on the axle 1, by means of a control member 21 and key 21a, and against the resistance of a spring 22, is a sliding dog 23, which may engage either with the dogs 18 on the planet cage or with the dogs 19 on the annulus or with the dogs 20 in the annulus, this three-point control providing three speeds as in the known arrangements, for example in the gear shown in Patent No. 2,168,600. The sliding dog 23 at the extreme end of its movement to the right is carried into engagement with the extensions of the pawls 17 and move the same about their pivots 17a and withdraw said pawls 17 from engagement with the ratchet teeth 11.

Loosely and slidably mounted on the axle 1, are two sun wheels 24 and 25, in constant mesh respectively with the larger and smaller parts of the compound pinions 13. The sun wheel 24 is adapted to engage with internal dogs 26 in a fixed ring 27, so as to be held stationary thereby, whilst the sun wheel 25 carries lateral dogs 28 to engage with fixed dogs 29 on the axle and so be held stationary. These two sun wheels, although independently rotatable, are adapted to be moved axially as one, by means of a key 30 on the control member 21, and a spring 31 surrounding the axle. The sun wheel 24 is mounted on a sleeve having a flange or collar to impart the thrust for the axial movement. The control member 21 is of reduced diameter where it passes through the key 30, so as not to affect such key until the shoulder 21b comes into contact therewith.

In operation, with the gears as shown in Fig. 1 the sun wheel 24 is fixed, and therefore provides the reaction for the epi-cyclic train; the sun wheel 25 merely idling around the fixed axle 1. By moving the control member 21 axially, in known manner, three speeds are obtainable, as in the previous constructions; the "decrease" speed being obtained when the sliding dog 23 is in engagement with the splines 20 and has tripped the pawls 17 out of action; the shoulder 21b having then come up to the key 30, and the sliding dog 23 having been arrested, either by the spring 22 being compressed solid, or by the key 21a having come up against the end of its slot. Now by moving the control 21 still further to the right (Fig. 1), against the resistance of the small but stronger spring 21c, the sun wheels 24 and 25 are moved axially, so as first to release wheel 24 and then to arrest wheel 25, whereby, owing to the different sizes of the two sun wheels, another "decrease" speed is obtained, thus making the gear a four-speed gear. In the reverse direction of the control member 21, since the spring 21c is stronger than spring 22, the dog 23 is held in its extreme right position (Fig. 1) until the sun wheels have moved to their extreme left position. In more detail, the several speeds are obtained as follows: With the parts as shown in Fig. 1 the sun wheel 24 is keyed to the axle by the member 27 and therefore provides the reaction in the epicyclic train. The drive enters at wheel 5 and is transmitted by the long projections on member 4 to the sliding clutch 23 which engages with dogs 18 on the planet carrier 12 and therefore rotates that carrier. The consequent rotation of the pinions 13 is imparted to the annulus 16 which, by means of the ratchet pawls 17, drives the hub through the ratchet teeth 11. If now clutch 23 is moved to the right to engage the dogs 19, the drive is transmitted from that clutch to those dogs and therefore to the annulus 16 which again drives the hub through the ratchet teeth 11, this being a direct drive. If now clutch 23 is moved further to the right to engage the dogs 20, in doing which it trips the ratchet pawls out of the teeth 11 as before explained, the drive is therefore transmitted from clutch 23 to annulus 16, from there back to the pinions 13, which cause rotation of the planet carrier 12, which last, by its ratchet pawls, drives the hub through the ratchet teeth 10. Still further movement of the operating member 21, whilst not effecting further movement of clutch 23, withdraws sun wheel 24 from member 27 and engages sun wheel 25 with member 29 so that sun wheel 25 now provides the necessary reaction and by virtue of its difference of diameter brings about a different speed variation between members 5 and 7. When the hub is being driven through the teeth 11, since it is rotating at a faster rate than are the teeth on the planet carrier 12, it overtakes those teeth in the nature of a free wheel device.

According to the modification illustrated in Fig. 4, the sun wheels 24 and 25 are unaffected by the control 21, but instead they have an independent control 32. In this form of the invention the sun wheel 25 is normally the fixed one, by engagement of the dogs 28 and 29, but may be released by operation of the control 32, the continued operation of that control, against spring 32a causing the sun wheel 24 to be arrested by engagement with the dogs 26 (not shown in Fig. 4). Spring 21 causes sun wheel 25 to follow wheel 24, as in Fig. 1. Accordingly, the sliding dog 23 may move to any of its three alternative positions to give "increase," "direct" or "decrease" drives, whichever wheel 24 or 25 is in action. In all, therefore, five different speeds are obtainable with this form of the invention. Actually, six drives are obtainable, but as two of them are a direct drive, only five ratios result.

Referring now to Fig. 5 there may be more than two alternative sun wheels, and in that figure three such wheels are indicated. In this arrangement, as shown, the sun wheels do not move axially, but are selected by means of an internal sliding key 33 which may be moved in to one or other of the sun wheels to anchor it to the fixed axle. The sun wheel at the left-hand end has lateral dogs 34, the central sun wheel is fixed to a sleeve having internal dogs 35, and the other end sunwheel has internal dogs 36. The key 33 is shown in engagement with the dogs 35. Any other suitable form of selector mechanism may be adopted. There are three working positions of clutch 23 irrespective of whichever sun wheel is keyed to the axle, so that in all there would be nine drives. However, as in one of each of the three positions of the member 23 there is a direct drive to the hub three of those nine drives are identical, bringing the total down to seven. Therefore, allowing a direct drive for one position of the clutch 23, each of the other two positions provides as many drives as there are sun wheels, so that the total is always twice the number of sun wheels plus one.

Whilst in the modifications illustrated the independent controls are shown as operable, from different ends of the axle, this need not necessarily be so. They could extend both from the same end of the axle, either one within the other, or side by side, and could be operated by separate wires (or the like), or, with suitable lost-motion or added-motion mechanism, by a single wire (or the like).

What I claim is:

1. An epi-cyclic variable speed gear comprising an epi-cyclic gear train including an annulus, a planet cage, compound planet pinions carried thereby, a sliding clutch for selectively coupling a driving member to the planet cage or to the annulus of the epi-cyclic train, a plurality of differently-sized sun wheels for said train, said compound planet pinions being in constant mesh therewith, and said clutch having a sliding clutch means for selectively coupling any one of the sun wheels to a fixed member to provide the necessary reaction for the train.

2. An epi-cyclic variable speed gear comprising a central axle, a planet cage, an annulus, a driving member and a driven member, all rotatably mounted about the axle, a pawl and ratchet drive from the annulus to the driven member, and a further pawl and ratchet drive from the planet cage to the driven member, sun wheels arranged rotatably on the axle, and compound planet pinions in the planet cage in constant mesh therewith, a clutch member slidable along the axle between three positions, in one of which it couples the driving member to the planet cage, in another of which it couples the driving member to the annulus, and in the third of which it both couples the driving member to the annulus and trips out the pawls thereon to release it from the ratchet, and clutch member operating means slidable in the axle to lock any one of the sun wheels thereto and provide the reaction for the epi-cyclic train.

3. An epi-cyclic variable speed gear according to claim 2 wherein the sliding clutches receive their sliding movement from a single reciprocating member housed within the axle, and wherein there is a lost motion between such member and one of the clutches, a spring being provided to retain that clutch in its normal position whilst the lost motion occurs.

4. An epi-cyclic variable speed gear according to claim 2 wherein one clutch receives its sliding motion from a member projecting from one end of the axle, whilst the other receives its motion from a member projecting from the other end of the axle, the said members being independent of each other for independent movement.

5. An epi-cyclic variable speed gear according to claim 2 wherein the selection amongst the sun wheels is made by means of a key slidably through them.

6. In an epicyclic variable speed gear having a sliding clutch for selectively coupling a driving member to a planet cage or to an annulus of the epicyclic train, the combination therewith of three side-by-side sun wheels each of different diameter, and compound pinions in the planet cage in constant mesh therewith, the centre sun wheel being fixedly mounted on a sleeve which also projects into one outer sun wheel, clutch teeth on the side face of the other outer sun wheel, clutch teeth within the said sleeve and clutch teeth within the first-named outer sun wheel, and a key slidable so as to engage with any of such clutch teeth to hold the corresponding sun wheel against rotation and provide a reaction for the epicyclic train.

7. An epicyclic variable speed gear comprising a fixed central axle, a selector slidable thereon against the pressure of a spring, rotatable sun wheels also slidable thereon against the pressure of a further spring, a key acting on the selector to impart its sliding movement and a further key acting on the sun wheels to impart their sliding movement, a draw rod passing through both keys, a strong spring on such rod to impart movement to the first named key, and a lost-motion space between the draw rod and the second-named key, such space allowing movement of the first key without the second, and the strong spring allowing movement of the second key without the first.

8. An epicyclic variable speed gear comprising a fixed central axle, two sets of clutch teeth thereon, a pair of side-by-side sun wheels rotatable on the axle and slidable together between the two sets of clutch teeth so that each wheel may engage with the adjacent clutch teeth whilst the other is free, and a spring normally holding the sun wheels at one end of their sliding movement; a planet cage rotatable about the axle and carrying compound planet pinions in constant mesh with both the sun wheels, ratchet pawls on the planet cage; an annulus around the axle in constant mesh with the compound pinions, ratchet pawls on the annulus; a driving member and a driven member, two sets of ratchet teeth on the driven member, to engage respectively with the pawls on the planet cage and the pawls on the annulus; a clutch member in constant engagement with the driving member and slidable along the axle to engage either the planet cage or the annulus, or both to engage the annulus and trip its pawls out of their ratchet teeth, a spring normally holding such clutch member at one end of its path in engagement with the planet cage; and a sliding rod in the axle with a key to operate the said clutch member slidewise, and a further key to operate the sun wheels slidewise, a spring to hold that rod normally in its neutral position, such spring providing the connection between the rod and the key for the clutch member and being stronger than that which returns the clutch member, and said rod being shaped so as not to shift the sun wheel key until it has shifted the clutch member key to the full end of the stroke against its spring.

9. An epicyclic variable speed gear comprising a fixed central axle, two sets of clutch teeth thereon, a pair of side-by-side sun wheels rotatable on the axle and slidable together between the two sets of clutch teeth so that each wheel may engage with the adjacent clutch teeth whilst the other is free, and a spring normally holding the sun wheels at one end of their sliding movement; a planet cage rotatable about the axle and carrying compound planet pinions in constant mesh with both the sun wheels, ratchet pawls on the planet cage; an annulus around the axle in constant mesh with the compound pinions, ratchet pawls on the annulus; a driving member and a driven member, two sets of ratchet teeth on the driven member, to engage respectively with the pawls on the planet cage and the pawls on the annulus; a clutch member in constant engagement with the driving member and slidable along the axle to engage either the planet cage or the annulus, or both to engage the annulus and trip its pawls out of their ratchet teeth, a spring normally holding such clutch member at one end of its path, in engagement with the planet cage, a sliding rod within and projecting from one end of the axle, with a key to operate the clutch member against the pressure of its spring, a further sliding rod within and projecting from the other end of the axle with a key to operate one of the sun wheels against the pressure of their spring, and a further spring to cause the other of the sun wheels to follow the movements of the one engaged by the key.

W. BROWN.